J. HOMAN.
GRAIN SHOCKING MACHINE.
APPLICATION FILED OCT. 21, 1907.
996,857.
Patented July 4, 1911.
6 SHEETS—SHEET 1.
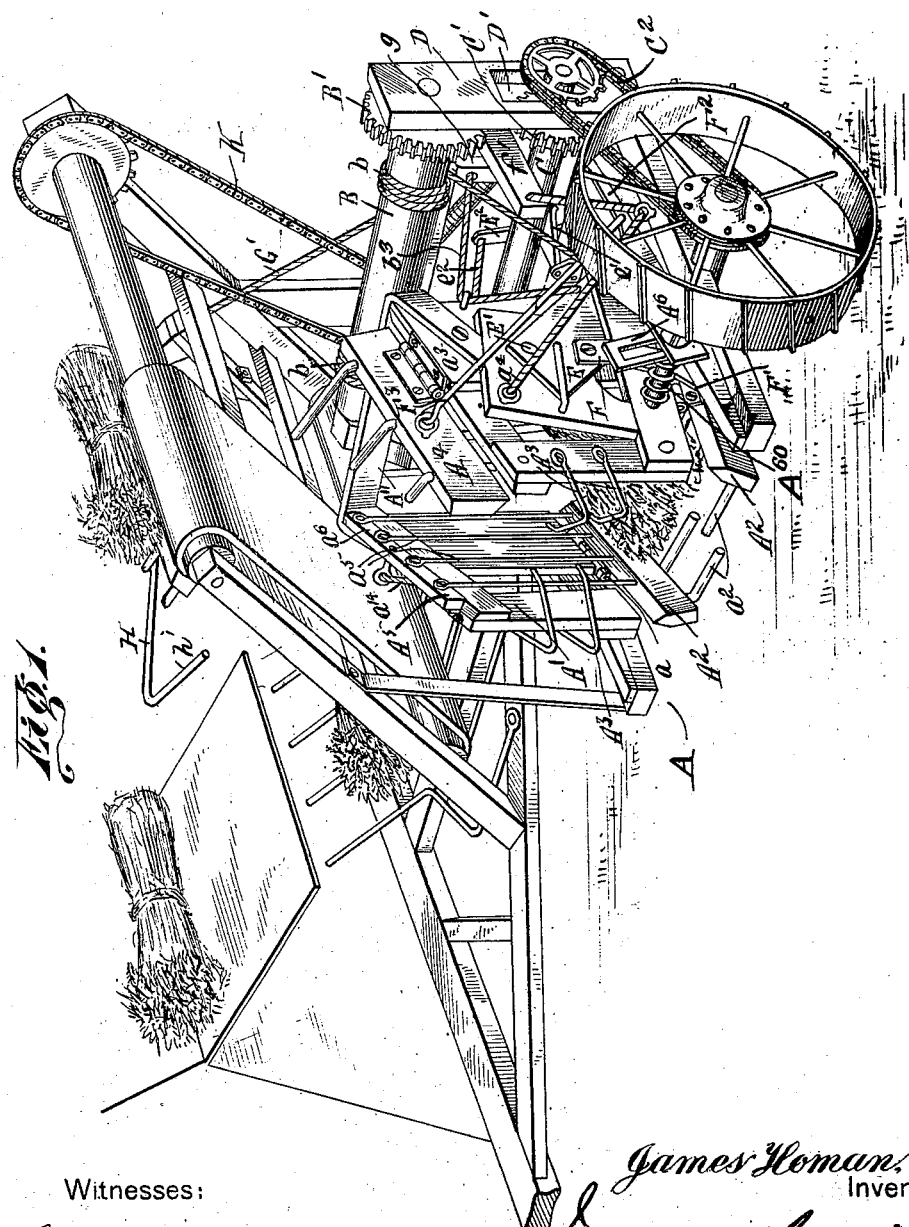
Witnesses:
James Homan,
Inventor,
By Marion & Marion
Attorneys

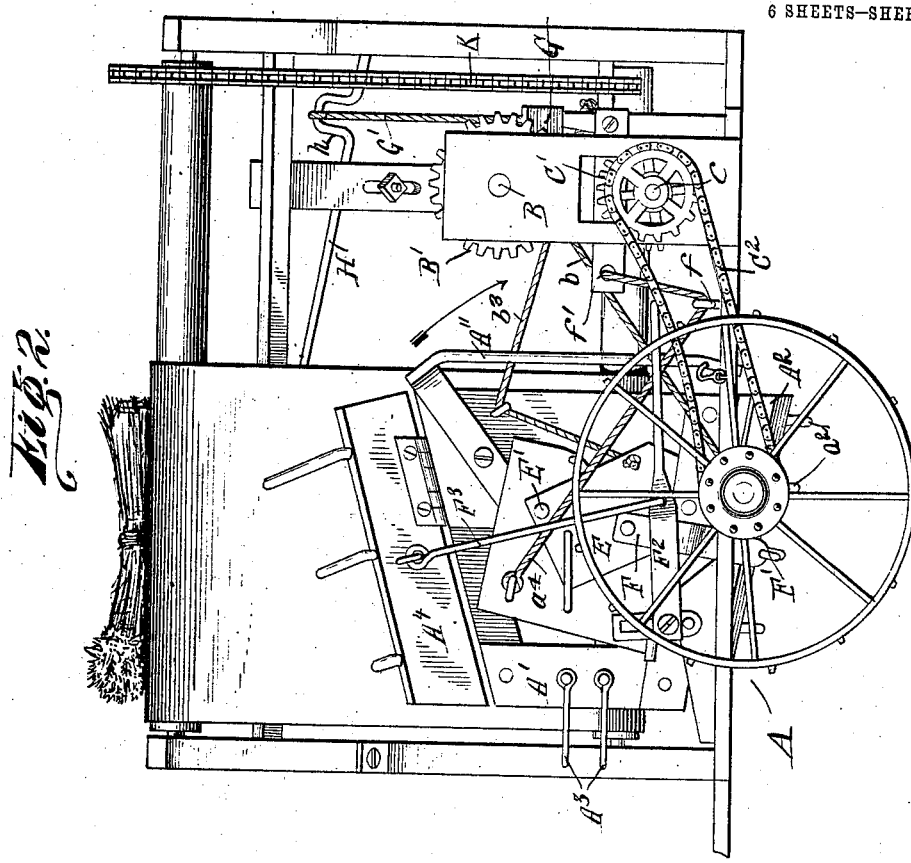
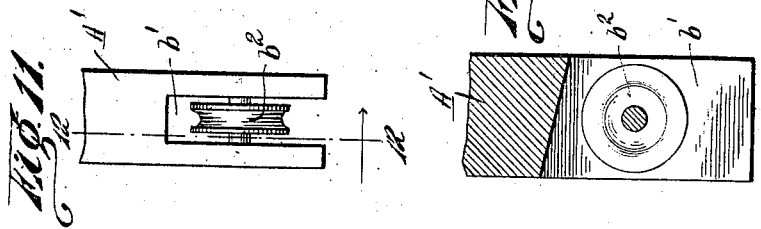

J. HOMAN.
GRAIN SHOCKING MACHINE.
APPLICATION FILED OCT. 21, 1907.
996,857.
Patented July 4, 1911.
6 SHEETS—SHEET 3.
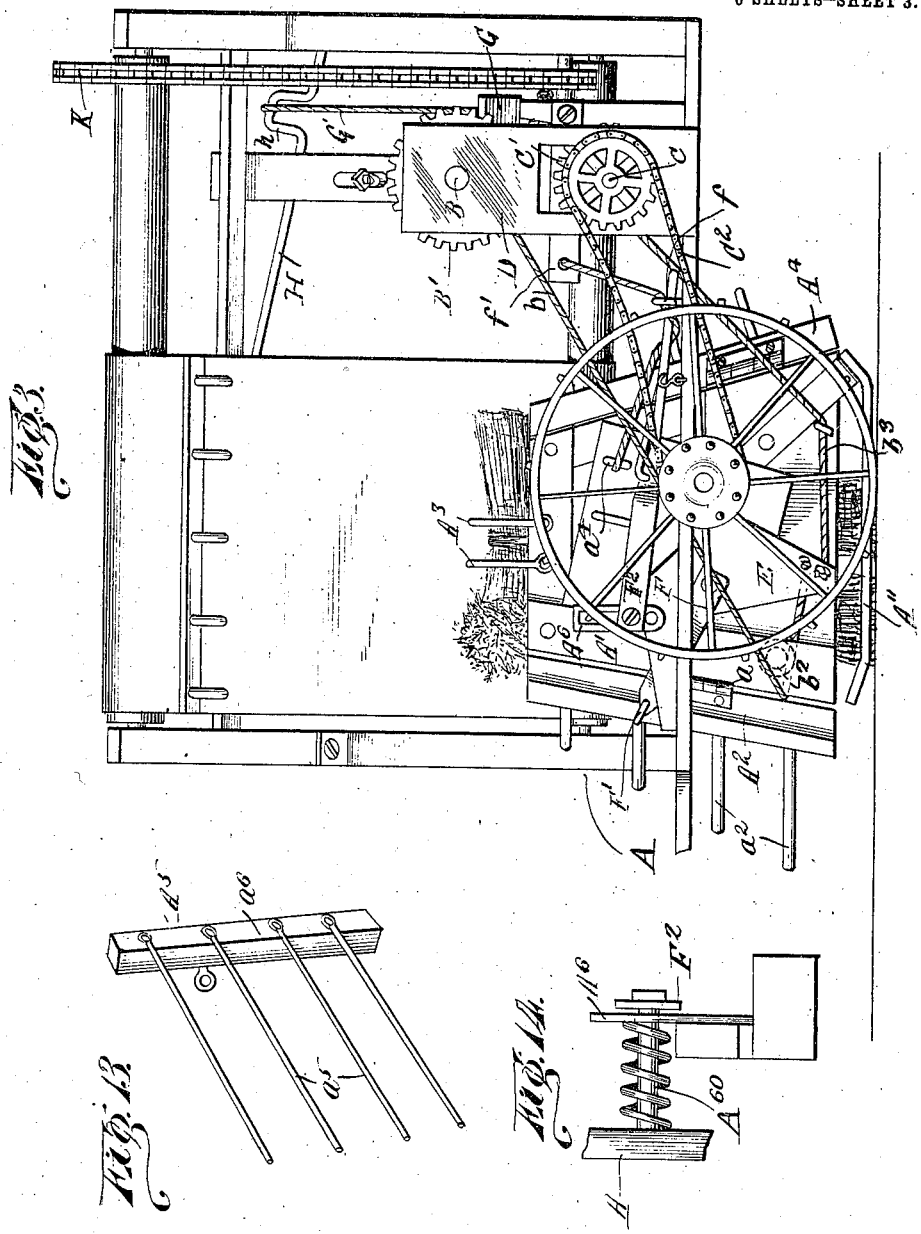

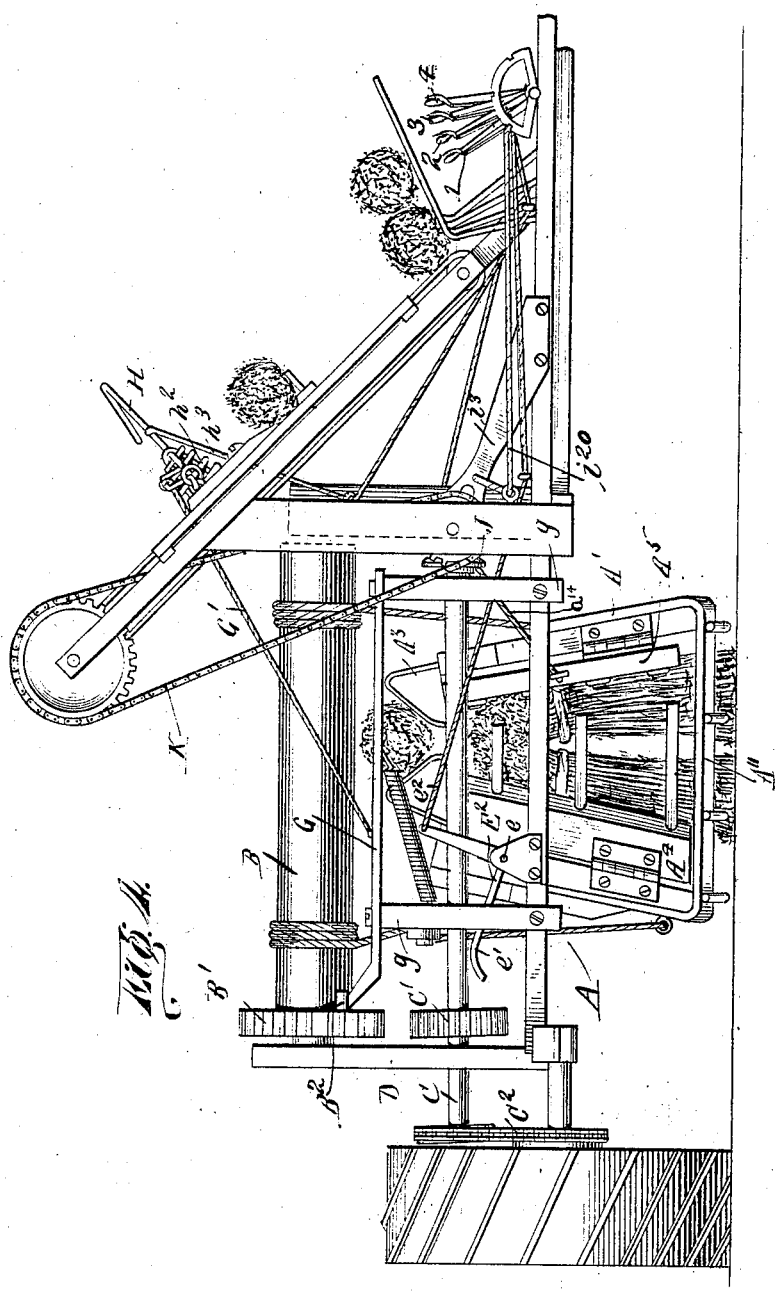

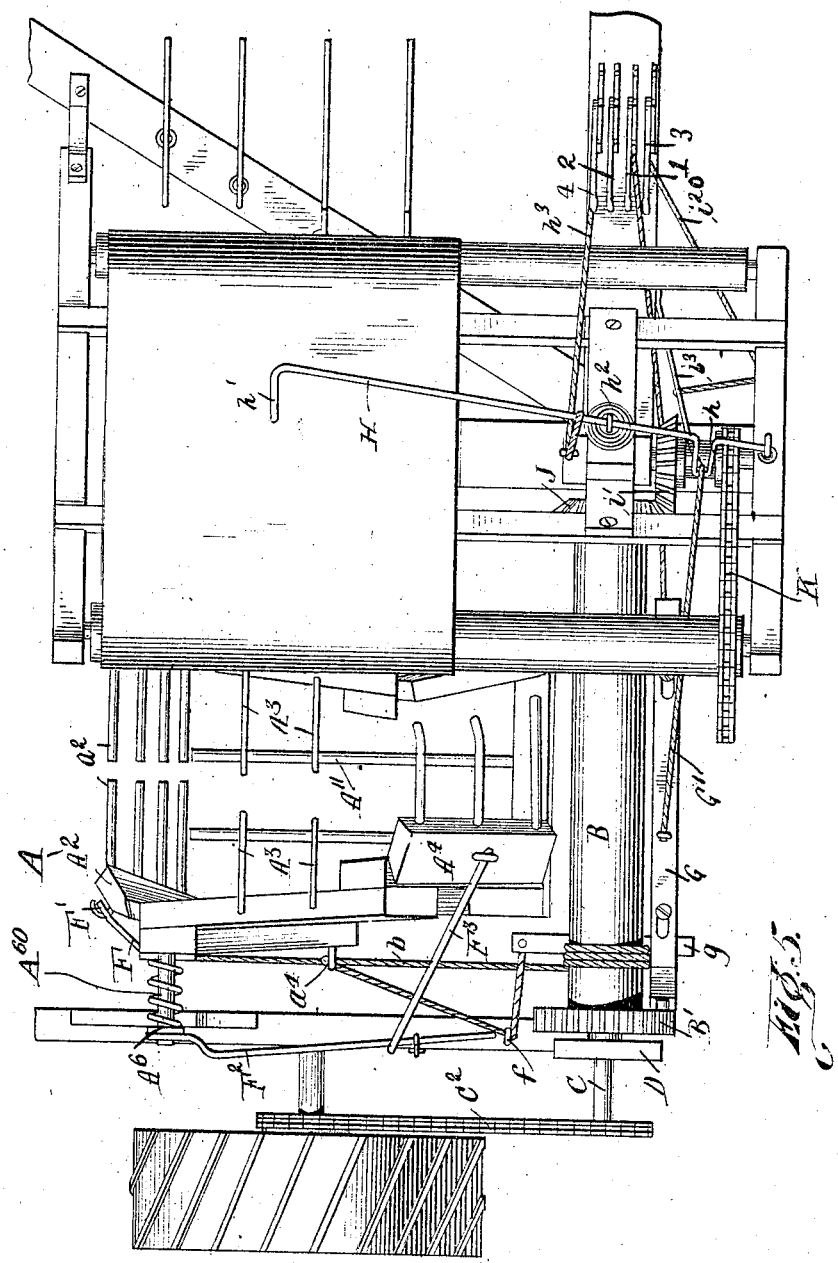

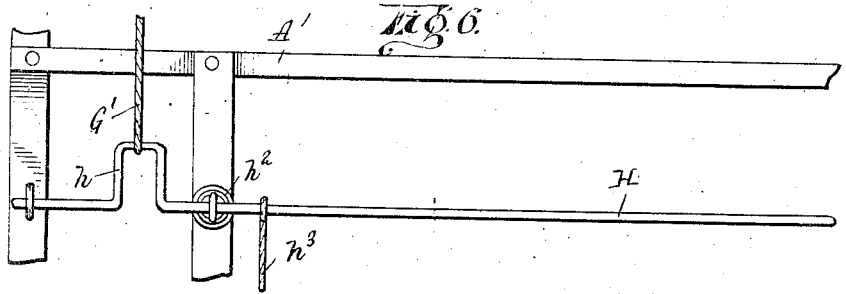
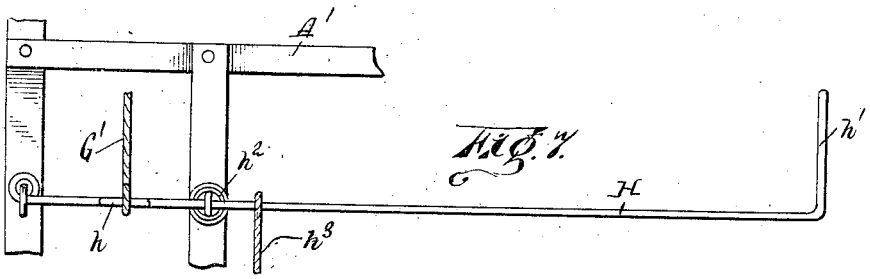
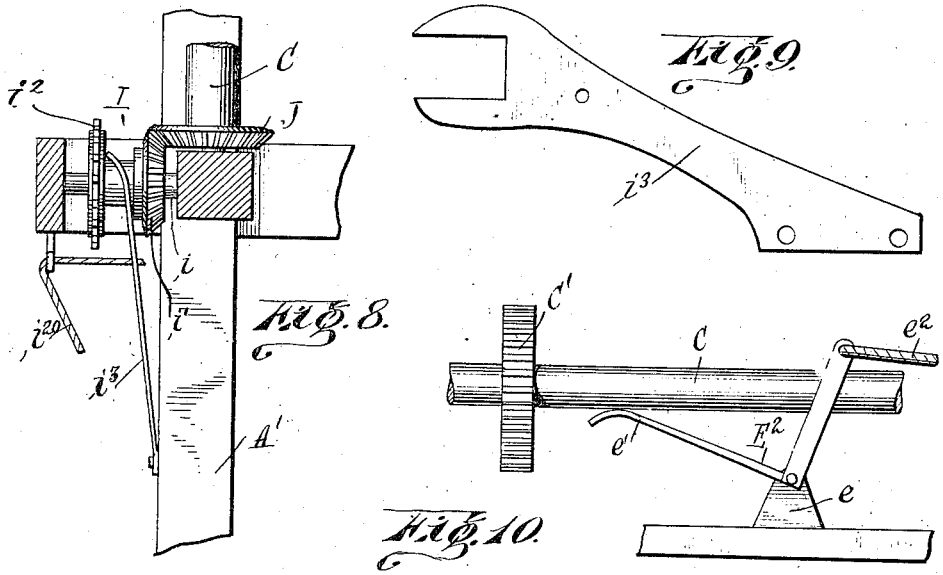

UNITED STATES PATENT OFFICE.

JAMES HOMAN, OF GRAND VIEW, MANITOBA, CANADA, ASSIGNOR OF ONE-HALF TO ROBERT ALEXANDER BRUCE, DAVID DOWNIE, GEORGE HENRY IRVIN, JAMES TAIT, AND JOHN HILLYARD CAMERON TODD, ALL OF GRAND VIEW, CANADA.

GRAIN-SHOCKING MACHINE.

996,857. Specification of Letters Patent. Patented July 4, 1911.

Application filed October 21, 1907. Serial No. 398,308.

*To all whom it may concern:*

Be it known that I, JAMES HOMAN, a subject of the King of Great Britain, residing at Grand View, county of Riding Mountain, in the Province of Manitoba, Canada, have invented certain new and useful Improvements in Grain-Shocking Machines; and I do hereby declare that the following is a full, clear, and exact description of the invention, such as will enable others skilled in the art to which it appertains to make and use the same.

This invention relates to a shocking device adapted for attachment to and coaction with the usual self-binding harvester.

The structure, organization and operation of the invention are such that the attachment may be applied very readily to any ordinary binder and may be sold either with or independently thereof. By its means, as the sheaves are discharged from the binder-deck they are thrown into a shocking basket arranged to turn and to swing and connected with suitable mechanism for either manually or automatically operating it, so that when a proper number of sheaves is accumulated the basket may be thrown into open position and the sheaves stood upright in the field, closely nestled together in the form of a shock.

The specification is an exact description of one form of the invention, while the claims define the actual scope thereof.

Reference is to be had to the accompanying drawings forming a part of this specification, in which similar reference characters designate like parts in all of the views.

In the drawings: Figure 1 is a perspective of the device attached to a self-binder, the shocker being in position ready to receive the sheaves; Fig. 2 is a side elevation of the same with the lever $F^2$ freed from its holding hook; Fig. 3 is a side elevation in position preliminary to dropping the load; Fig. 4 is a front end elevation of the device in shock dropping position; Fig. 5 is a plan view of the same; Figs. 6 and 7 are detail views of the sheaf operated crank shaft H; Fig. 8 is a plan view of the apron drive mechanism; Fig. 9 is a plan view of the spring gear shifter; Fig. 10 is a side elevation of the lever for lifting the loose drive shaft; Figs. 11 and 12 are front and part sectional side views of the guide roller for the shocker operating cord; Fig. 13 is a perspective view of the sheaf guide; and, Fig. 14 is a front view of the positioning spring adapted to keep the shocker out of accidental contact with its supporting frame.

Broadly speaking, the invention comprises a shocker adapted to receive a plurality of sheaves of grain, to automatically straighten out and arrange said sheaves into a shock or stack, and to deposit said shock as a whole when so completed.

Referring more particularly to the drawings forming a part of this specification, the shocker as a whole represented by A comprises a rigid box-like framework A' constituting substantially three sides of a box, the intermediate section A'' consisting of rigid bars forming a grid like floor on which the sheaves normally rest before being deposited. Hinged to the sides of this framework at $a$ are the end or retaining gates $A^2$ provided with approximately intermeshing tines or fingers $a^2$. Two opposite edges of the side sections of the framework are provided with curved guide fingers $A^3$ adapted to receive and guide into place within the shocker a finishing or capping sheaf as it is delivered from the apron. To the edge $a^3$ of the framework A' is hingedly fastened a gate $A^4$ adapted to be swung open to admit the sheaves for forming the shock, as clearly shown in Fig. 1. To the opposite edge of the framework is similarly connected a depending sheaf guide or straightener $A^5$ comprising a plurality of tines or fingers $a^5$ attached to a bar $a^6$, said guide as a whole lying vertically along within and being capable of a swinging movement as a whole toward the opposite face of the frame, whereby it may guide the sheaves into their proper position to form the shock, as clearly shown in Fig. 1.

The shocker A as an entirety is revolubly mounted on shafts $A^{60}$, said shafts having bearings in slotted brackets $A^6$ mounted on the frame, whereby said shafts and the shocker A mounted thereon are allowed slight vertical movement (see Fig. 1).

In the operation of the device, the intermediate or grid section A'' may more properly be referred to as the bottom, the side nearest the harvesting machine may more properly be referred to as the inner side or inner side member or section, the opposite side may be more properly referred to as the outer side or outer side member or section. The grid section approaches more closely to the surface than any other part of the device and it supports the butt ends of the sheaves, as they are being delivered from the shocker. Therefore, it would seem that the grid section may be more properly referred to as the bottom, than any other section. When in depositing position, that end of the device which is nearer the forward end of the harvester would seem to be more properly referred to as the forward end or front, and the opposite end as the rear end or back. Likewise, in the same position, the top would be the side opposite the grid or bottom. Throughout the claims, the terms bottom, inner side, outer side, front, top, and rear will all have reference to the depositing position of the device or shocker, for greater clearness.

In order to retain the end gates $A^2$ locked in position to hold the sheaves within the shocker, it is necessary to provide some means which will not interfere with the opening or operating of the gates for dropping or depositing the shock when desired; also it is essential that both said gates be operated simultaneously in order to prevent disturbing the shock as it passes out between said gates on being dropped.

As a preferable means for locking or holding said gates in the manner aforesaid, I have provided a revoluble shaft B, having thereon a gear $B'$ adapted to mesh with and be driven by a gear $C'$ on a shaft C, said shaft being slidably mounted in a slot $D'$ in the upright D, which likewise supports shaft B. The shaft C is driven by a sprocket chain $C^2$, which in turn is driven from a sprocket on the binder wheel, as clearly shown in the several figures. Attached to the shaft B are cords, chains or the like $b$, adapted to be wound thereon. Said cords are passed through slots or openings $b'$ in the sides of the framework over rollers $b^2$ in said slots, then turned and have their loose ends connected respectively to one arm of separate bell-crank levers E fulcrumed to the shocker frame at $E'$. To the elbow of the bell crank lever is pivotally connected one end of the link F, the opposite end of which is similarly connected to the end gate at $F'$ (all as clearly shown in Figs. 1 and 3). Clearly, when the cords $b$ are wound on the shaft B, the bell crank lever E will be thrown to the rear and the link $F'$ will be forced to holding or locking position, whereby the end gates will be securely held in place against opening.

In order to automatically swing the gates $A^2$ to open position as the shocker reaches depositing position, cords $b^3$ are used. These cords are connected at one end to uprights $g$, and passed through eyelets on the shocker, having their opposite ends connected to ends of the bell cranks E. As the shocker turns to depositing position and just before it reaches such position, the cords $b^3$ will be drawn taut. Further turning of the shocker frame in the same direction causes operation of the bell cranks E to open the gates $A^2$.

In order to intermesh gears $B'$ and $C'$, and thereby drive the shaft B and operate the end gate locking mechanism, I have provided an elbow lever $E^2$, fulcrumed at $e$ to the framework of the machine, and having an arm $e'$ adapted to engage and lift the shaft C (see Figs. 1 and 4). To the opposite arm of the lever $E^2$, is attached an operating cord $e^2$, by which the lever may be worked when desired (see Figs. 4 and 10).

In order to retain the gate $A^4$ in its open position for admitting the sheaves and to automatically close the same when the shocker is lowered to drop the shock, I have provided a lever $F^2$ fulcrumed on one of the shafts supporting the shocker, a link $F^3$ pivotally connected at its ends respectively to the gate $A^4$ and to the lever. A hook or any similar well known device may be used for holding the lever $F^2$ in its depressed position. It is clear that as the shocker is swung to its sheaf receiving position, the lever and link device will operate to open the gate $A^4$, and that when turned to position to drop the shock, said gate will be held closed through the same instrumentalities, (see Figs. 1 and 5).

The winding up of cords $b$ for locking the end gates in closed position also acts at the same time to turn the shocker into sheaf receiving position. When so turned, it is clear that it is essential to hold the shocker in operative position. For so locking the shocker, I have provided the following means: On uprights $g$ I have mounted a spring-actuated slotted sliding bar G adapted to engage a pin $B^2$ on one face of the gear $B'$, whereby said gear is positively locked against rotation when desired. In order to release the gear, I have attached to said bar an operating cord $G'$, said cord having its opposite end attached to the crank $h$ of a crank arm H, said crank arm being rotatably mounted in suitable bearings on the framework of the machine. The crank arm H in its normal position lies above the run of the sheaf delivering apron and is provided with a branch $h'$ with which a sheaf, traveling on said apron, is adapted to engage when said crank arm is depressed, and turn said crank arm to thereby operate the crank $h$ and through said crank and the aforesaid connecting cord retract the locking bar G to release the gear $B'$, allowing the shocker to drop into unloading position. Normally, the crank shaft H is held in its elevated and inoperative position by means of the spring $h^2$ (Fig. 4).

In order to limit the rearward swing of the sheaf receptacle to prevent it from passing beyond sheaf receiving position, a limit cord $a^4$ has been provided. This cord is connected at its opposite ends to the framework of the receptacle A and to an arm $f'$, and is passed through an eyelet $f$. As the receptacle reaches sheaf receiving position, the cord will be straightened out and further rearward movement prevented.

It is desirable to put the capping sheaf on to the shock simultaneously with the dropping or complete turning of the shocker into shock delivering position. Therefore when the shocker has been loaded, the crank arm H is depressed by the cord $h^3$ running through suitable eyelets (see Fig. 4). It is clear that when said crank arm H is depressed into the path of the sheaves, the first sheaf on the apron will engage the branch $h'$, rotate the same, and, through such rotation operate the crank $h$, and thereby operate the sliding bar G to release the shocker, the capping sheaf falling from the apron on to the shock top simultaneously with such release.

In order to drive the apron from the wheel of the machine, as usual I have provided a slidably mounted gear, designated as a whole by I, reciprocable on and rotating about the fixed shaft $i$. This gear comprises two members $i'$ and $i^2$, the first being a bevel gear adapted to intermesh with a similar gear J on shaft C and to thereby derive motion therefrom, and the second being a sprocket wheel adapted to drive a sprocket chain K for operating the apron, as will be readily understood by one versed in the art. In order to maintain the contact between the gears $i'$ and J, I have provided a spring arm $i^3$, one end being connected to the framework of the machine, while the opposite end is bifurcated and embraces the sleeve portion connecting gears $i'$ and $i^2$, normally maintaining the contact by its resilient action upon the inner face of gear $i'$ (Figs. 8 and 9). In order to withdraw the arm and free the gears $i'$ and J, if so desired, I have provided a cord $i^{20}$ passing through a suitable eyelet (Figs. 5 and 8).

For operating the sheaf guide or straightener $A^5$, I have attached to the same a cord $a^{14}$, which passes through suitable eyelets (as clearly shown in Figs. 1 and 4.)

The operation of the machine is as follows: The gears B' and C' are intermeshed as described, whereby the shocker is thrown into load receiving position, the gates $A^2$ being simultaneously locked in position. When the shocker has been fully positioned, the locking bar is slid beneath the lug or projection on the gear B' and the gears B' and C' are thrown out of mesh. After the shocker has been loaded, the operating cord is pulled to depress the crank lever H into the path of the next sheaf on the apron, which sheaf strikes the branch of the said crank arm and by rotating the same retracts the bar, thereby tripping the shocker holding mechanism, allowing the shocker to fall into delivering position at the same instant that the last or capping sheaf falls on to the top of the shock so positioned. The stubble of the sheaves projects through between the grids of section $A''$ (Fig. 4) and through their engagement with the ground surface said shock is forced bodily out through the gates $A^4$ and deposited as will be readily understood. If it is desired to stop the travel of the sheaf delivering apron at any time during the movement of the machine, without stopping the machine, it is only necessary to disconnect the gears $l$ and J as previously described. For holding the various operating cords in their operative positions, I have attached them respectively to the levers 1, 2, 3 and 4, said levers being provided with spring pressed dogs adapted to engage locking notches in suitable arc shaped plates or brackets attached to the frame of the machine.

Having thus fully described my invention, what I claim as new, and desire to secure by Letters Patent, is:—

1. In a shocker attachment for harvesting machines, a shocker frame, a forwardly dumping box like sheaf receptacle pivotally mounted therein and comprising two side walls and a grid bottom connecting said side walls, coöperating sheaf supporting gates hinged to the rear edges of said side walls, a sheaf straightener depending within said receptacle and pivotally connected to the front edge of the inner side wall, means for forwardly dumping said sheaf receptacle to depositing position, and means for opening said sheaf supporting gates as said receptacle reaches depositing position.

2. In a shocker attachment for harvesting machines, a shocker frame, a forwardly dumping box like sheaf receptacle pivotally mounted therein and comprising two side walls and a grid bottom connecting said side walls, coöperating sheaf supporting gates hinged to the rear edges of said side walls, means for guiding a capping sheaf to the top of a completed shock within said receptacle, means for swinging said receptacle to sheaf receiving position, and means for closing and opening said gates as said receptacle is swung to and from receiving position.

3. In a shocker attachment for harvesting machines, a shocker frame, a forwardly dumping box like sheaf receptacle pivotally mounted therein and comprising two side walls and a grid bottom connecting said side walls, coöperating sheaf supporting gates hinged to the rear edges of said side walls, sheaf guiding fingers secured to the upper edges of said side walls and adapted to guide a capping sheaf to position within said receptacle, means for raising said receptacle to receiving position, means for so holding said receptacle, means for freeing said holding means to allow said receptacle to drop by gravity to depositing position, and means for automatically opening the aforesaid gates as the receptacle is swung to dumping position.

In witness whereof I have hereunto set my hand in the presence of two witnesses.

JAMES HOMAN.

Witnesses:
G. L. CHALLENOR,
G. M. RYAN.